Figure 5:
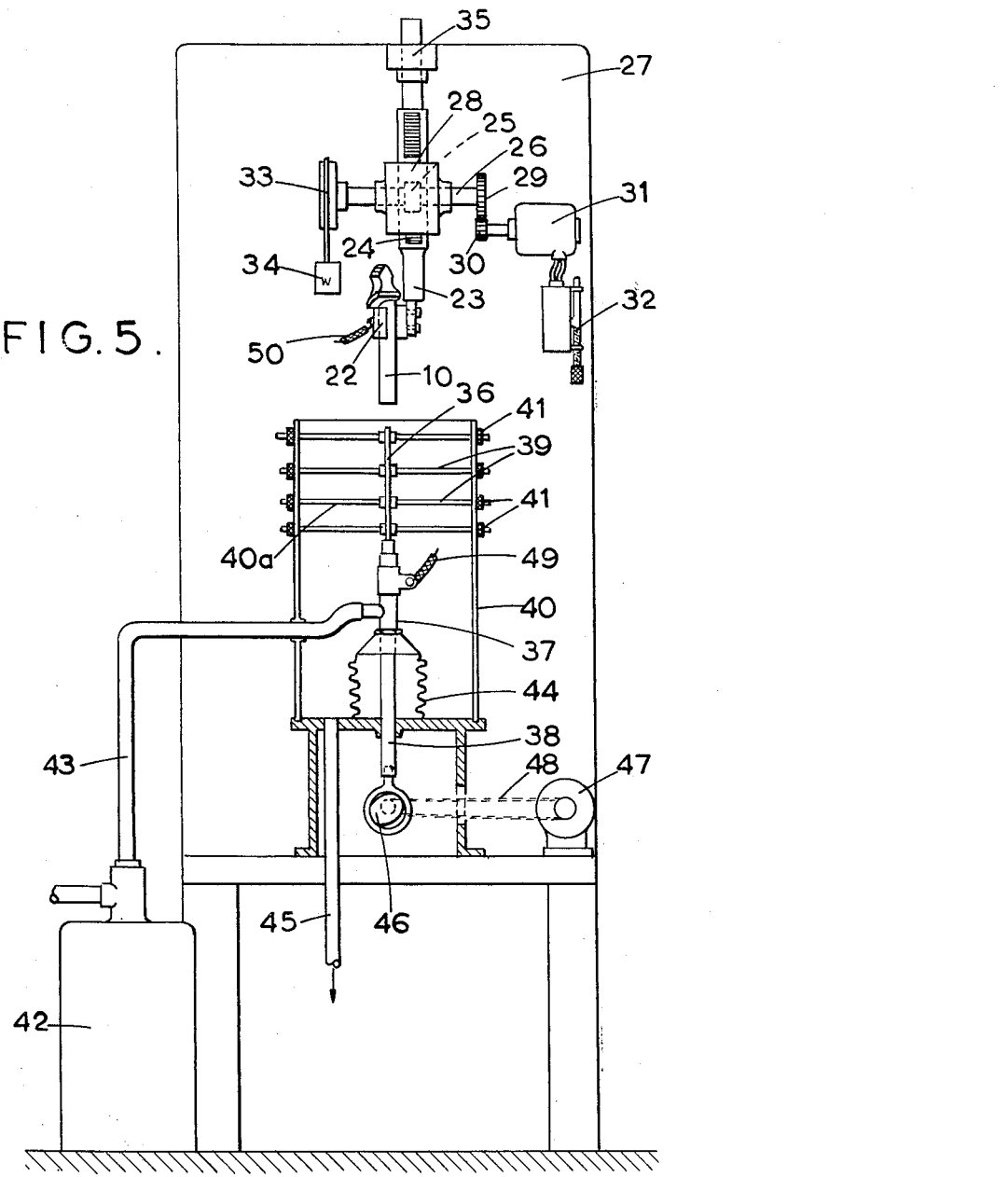

Nov. 10, 1964   W. T. DAVIES ETAL   3,156,808
MANUFACTURE OF TURBINE AND COMPRESSOR BLADES
Filed Nov. 19, 1957   6 Sheets-Sheet 1
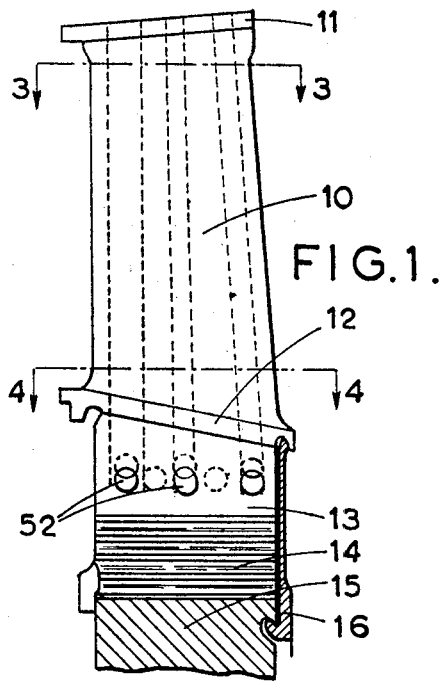
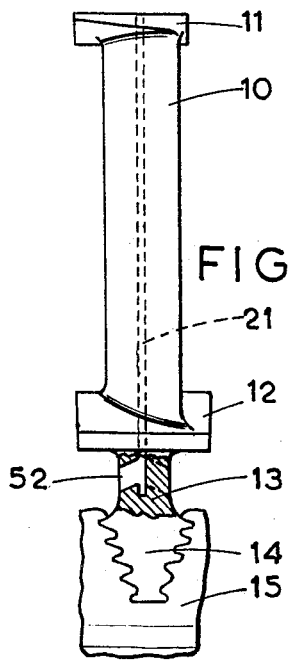
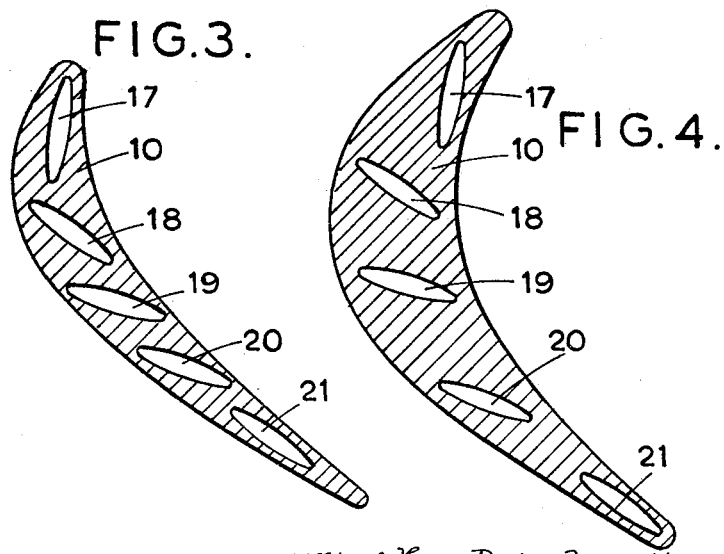
William Thomas Davies, Frank Henry Stark,
Inventors and
Henry Sidney Cateman
by Leech & Radue
Attorneys United States Patent Office 3,156,808
Patented Nov. 10, 1964

3,156,808
MANUFACTURE OF TURBINE AND
COMPRESSOR BLADES
William Thomas Davies, Fernside, Fritchley, near Ambergate, Frank Henry Stark, Chellaston, and Henry Sidney Bateman, Derby, England, assignors to Rolls-Royce Limited, Derby, England, a British company
Filed Nov. 19, 1957, Ser. No. 697,456
Claims priority, application Great Britain, Nov. 20, 1956, 35,521/56
5 Claims. (Cl. 219—69)

This invention is for the manufacture of turbine and compressor blades such as are used in internal combustion turbine engines, such blades having passageways running axially of the blade for the flow of cooling and/or heating fluid such as air. Such blades will be referred to as "blades of the type described."

In order to use the fluid efficiently it is desirable to make the passageways of small diameter or with a cross-section of flattened elliptical or lenticular form, and difficulties are experienced in forming this type of passageway, which extending over the full or a substantial part of the length of the profile portion of the blade is of considerable depth or length. This difficulty is particularly present in the case of turbine blades made in high-temperature resistant materials such as nickel-chrome alloys especially when the hole is near the leading or trailing edge of the blade.

According to this invention in the manufacture of blades of the type described one or more passageways are made by electric arc disintegration by using an electric arc drill of a shape corresponding to the shape of the desired passageway, the drill being adapted to be passed progressively through the blade as the passageway is formed and means for causing relative reciprocation between the drill and the blade whereby arcs are created between the drill and blade in the presence of a stream of an electrolytic liquid flowing through a hollow formation in the drill.

In this drilling process the blade or drill may be the anode. Further it has been found desirable to use an electrolytic liquid which by anodic action forms an insulating film on the surface of the blade material or on the drill which film is broken down at the point of drilling as a result of the reciprocation of the drill relative to the blade.

Further, in the drilling process according to the invention the distintegrated material is removed by the flow of electrolytic liquid which is supplied at a pressure sufficiently high to maintain a flow adequate for this purpose.

The invention also includes apparatus for carrying out the process of this invention comprising a hollow drill of a cross-sectional shape corresponding to the shape of the desired passageway means for supporting the blade and the drill, means for causing relative reciprocation between the drill and the blade, means for causing relative axial movement between the said blade and the drill as the hole is drilled, means for causing a flow of electrolytic liquid through the hollow drill, and means for supplying an electric current in a circuit including the drill and blade to cause arc disintegration between the drill and blade.

The process of the invention may be used for drilling holes of any desired cross-section, but one particular application of the invention is to turbine blades of internal combustion turbine engines having cooling passageways with a cross-section which is flattened elliptical or lenticular. Such blades have hitherto been produced by a forging or extruding process; as a result the attitude and arrangement of the holes have been defined by the requirements of the process employed. Thus if lenticular holes are required and are produced by extrusion or forging, then their major axes must lie in a plane substantially normal to the direction in which the dimension of the billet is reduced. The present invention, using a drilling process, enables the pattern of the holes and their attitude within the blade cross-section to be selected without such limitation.

A twisted or helical hole may be formed by a helical drill which is rotated or in relation to which the blade is twisted during the drilling process.

Thus in a blade with twisted profile the hole may be one which retains the same disposition relative to the external profile of the blade at any section.

One suitable electrolyte is sodium silicate and water and a range of one part of silicate to one part of water to one part of silicate to six parts of water has been used successfully to form a silicate film by anodic action.

Figure 6:
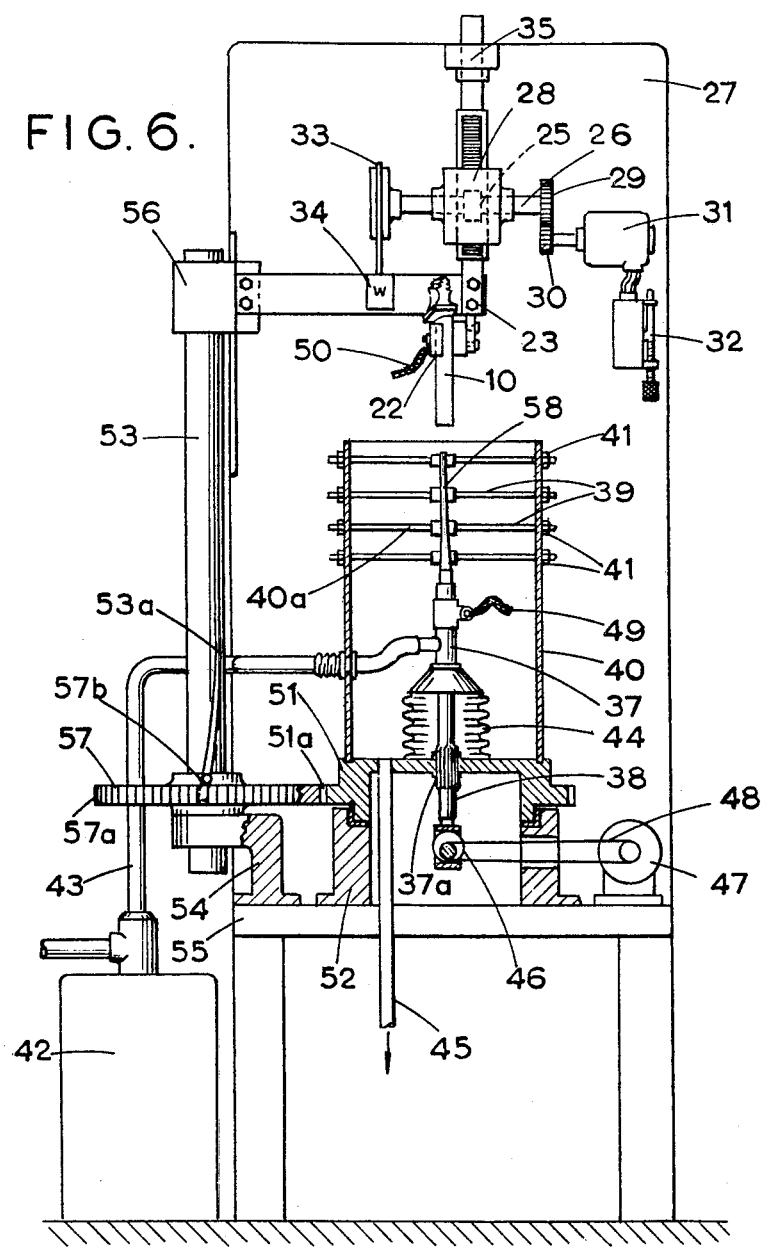
Figure 7:
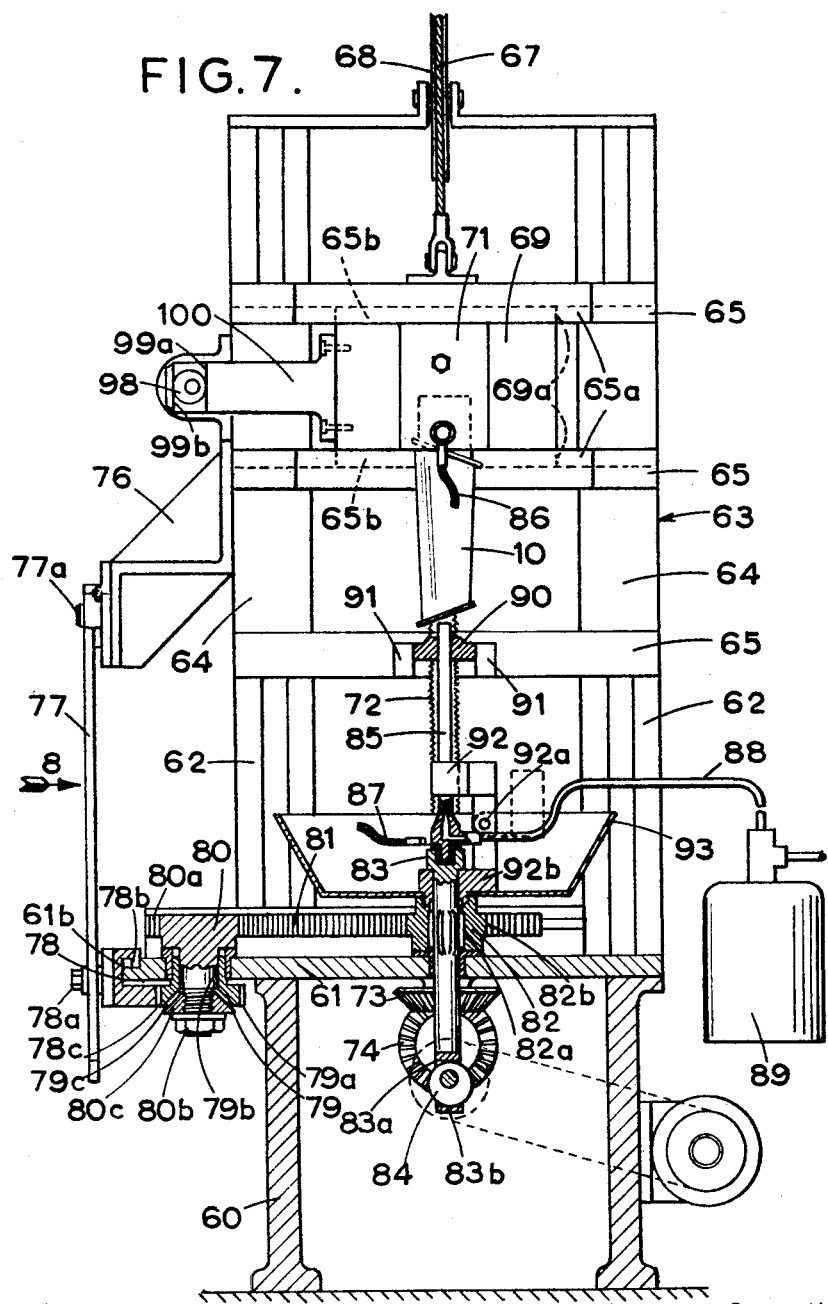
Figure 8:
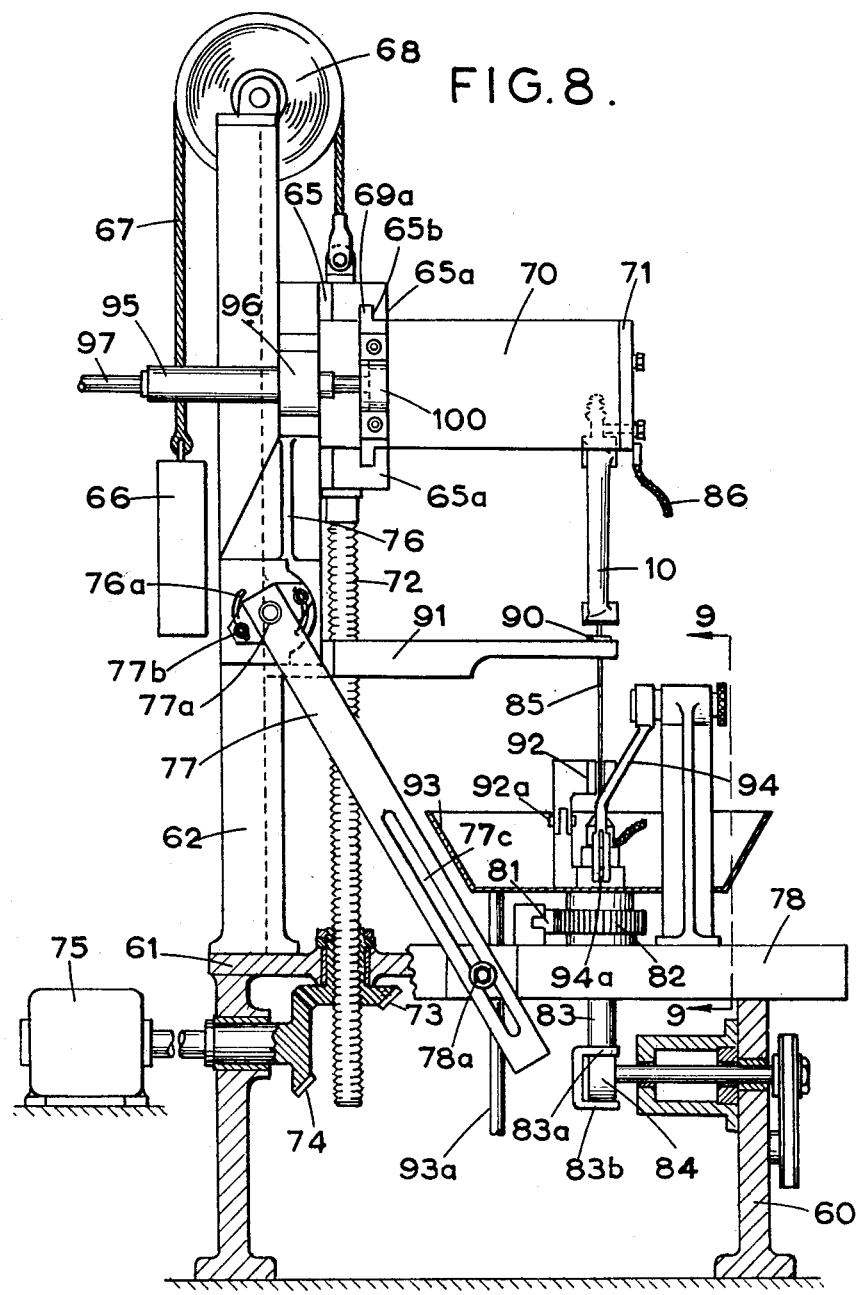
Figure 9:
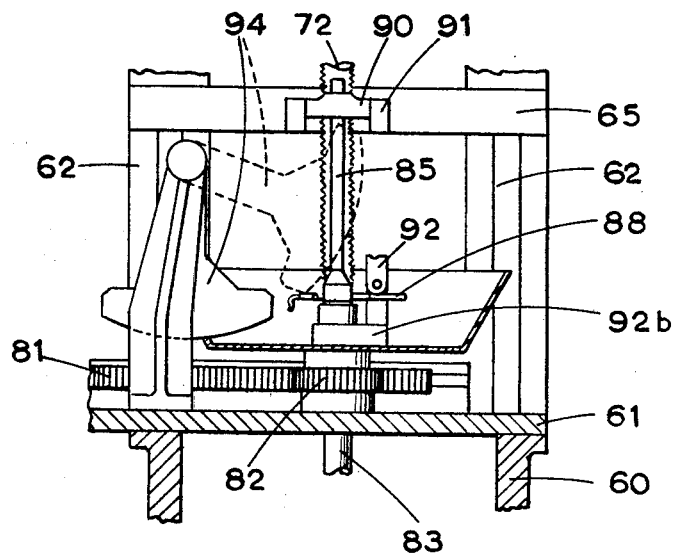

A preferred process of this invention is illustrated in the accompanying drawings:

FIGURE 1 is an elevation of a turbine blade.
FIGURE 2 is a view of the same blade from a direction at right angles to FIGURE 1.
FIGURES 3 and 4 are sections on the lines 3—3 and 4—4 respectively of FIGURE 1.
FIGURE 5 is an elevation of apparatus for drilling straight holes in the blade.
FIGURE 6 is a view corresponding to FIGURE 5 and showing the apparatus modified for producing twisted holes.
FIGURE 7 is a front elevation of a further embodiment of apparatus which is suitable for drilling either straight or twisted holes.
FIGURE 8 is a side elevation of the apparatus of FIGURE 7 as viewed in the direction of arrow 8, and
FIGURE 9 is a section on the line 9—9 of FIGURE 8.

FIGURES 1 to 4 illustrate the complete blade which has a blade portion proper 10, a tip shroud 11, a platform portion 12, a shank portion 13 and a fir-tree fixing portion 14, fitting into slots on the turbine disc 15. Gaps between the shank portions of adjacent blades are closed on one side of the disc by a plate member 16.

Passing axially through the blade portion and into the shank portion of the blade are cooling passageways 17, 18, 19, 20 and 21; these passageways are formed according to this invention.

The passageways may be formed by the apparatus illustrated in FIGURE 5.

The blade 10 is mounted tip downwards in a carrier 22 which is caused gradually to travel downwards by a shaft 23 to which the carrier is bolted and which has a rack engaged by a pinion 25 carried by a shaft 26 supported in bearings from fixed structure 27 by a casing 28. Shaft 26 carries on one end a pinion 29 which is driven by a pinion 30 from an electric motor 31, the speed of which is controlled by a speed control 32. On the other end of shaft 26 is a pulley 33 carrying a weight 34 which helps to hold the blade 10 steady. The electric motor drive causes the blade to descend at the rate of 0.02 to 0.08 inch per minute. An extension upward of shaft 23 slides through a bearing 35 supported from the fixed structure 27 and guides the shaft 23 vertically.

A hollow tubular drill 36 is carried by a shaft 37 in a bearing 38 from the fixed structure. The drill is further supported by a series of X-shaped rods 39 from an upright cylinder 40 to which they are located by nuts 41. The rods at their point of intersection carry ring bearings 40a which support slidably the drill. The rods can be removed in turn as the drill passes further into the hole which it is forming in the blade. A sodium silicate solution of say 1 part of silicate to 3 parts of water or other suitable electrolyte solution is fed by compressed air from a tank 42 through pipe 43 to the hollow interior of shaft 37 whence it passes up through the hollow drill washing away the disintegrated debris and cooling the drill and blade at the point of disintegration thereafter it flows down between the drill and the walls of the hole to insulate the drill from the blade, the liquid passes from the cylinder 40 through escape pipe 45. The insulation of the side faces of the drill from the blade material is further increased by the formation of an anodic film which is not broken down by the reciprocation of the drill. At the bottom of shaft 37 an eccentric or crank 46 driven from a motor 47 through belt 48 causes the shaft 37 to be reciprocated or vibrated at a frequency from 3000 to 4000 cycles per minute.

A direct current or an alternating current superposed on a direct current is passed from lead 49 and drill 36 across the arc gap between drill and blade through the blade 10, holder 22 and lead 50. Satisfactory drilling has been obtained using a voltage of between 6 and 24 giving rise to a maximum current of the order of 100 amps.

When the holes have been drilled in this way further lateral drillings (see FIGURE 2) are made through the shank portion 13 of the blade to connect with the base of the holes.

When it is desired to drill holes in the blade which are twisted about their lengthwise axes, apparatus as shown in FIGURE 6 may be used.

In this figure like numerals are used for parts corresponding to those in FIGURE 5. The base supporting the cylinder 40 is formed in two parts 51 and 52, part 51 being rotatably mounted on part 52 and part 51 being formed with gear teeth 51a around its periphery. A shaft 53 having on its surface a helical guide channel 53a is mounted vertically for movement axially of itself in a bracket 54 secured to the bed 55 of the machine and is held in a member 56 rigidly secured to the shaft 53. Mounted for rotation on the shaft 53 is a gear wheel 57 having teeth 57a in mesh with the gear teeth 51a and the hub of gear wheel 57 carries a pin 57b protruding into the guide channel 53a.

The drill 58 is similar to drill 36 in FIGURE 5 except that it has a twist about its lengthwise axis the same as the twist of the hole it is desired to produce in the blade.

As the blade is fed downwards on to the drill 58 by the downward movement of shaft 23 the shaft 53 will also move downwards and the gear wheel 57 will be rotated by the motion of pin 58b relative to the channel 53a. Part 51 will thus also be rotated and with it the drill 58. The shaft 37 carrying the drill 58 is provided with splines 37a to inhibit rotational movement of the drill relative to the part 51.

In FIGURES 7 to 9 there is illustrated another example of apparatus suitable for carrying out the invention. This apparatus may, by suitable adjustment, be used for drilling either straight or twisted holes. As illustrated the machine is adjusted for drilling twisted holes.

The machine comprises a base 60 supporting a bed 61 extending from the rear of which are two vertical slides 62. Mounted thereon is the work head 63 which comprises two vertical slide members 64 engaged in the slides 62 and, extending horizontally between the slides and secured thereto, are three members 65. A counter-balance weight for the work head is provided at 66, being suspended by a cable 67 over a pulley wheel 68, the other end of the cable being secured to the work head.

The centre sections 65a of the top two members 65 are thickened and are provided in their adjacent faces with channels 65b. A plate 69 has its top and bottom edges 69a rebated and received in the channels so that it is free for horizontal movement. Welded to the front face of plate 69 and extending at right angles therefrom are two plates 70, a further plate 71 being secured to the front edges of these plates.

Secured to thickened centre section 65a of the centre member 65 is the top end of the vertical feed screw 72 which is in threaded engagement with a bevel pinion 73 journalled in the bed 61. A further bevel pinion 74 journalled in the base 60 is in mesh with pinion 73 and is driven by electric motor 75 to produce a progressive downward feed of the work head 63, for example, 2½–3 inches per hour.

Secured to the side of the work head 63 is an arm 76 having the upper end of the sine bar 77 pivoted to it at 77a. The sine bar is adjustable about pivot 77a to alter its inclination to the vertical and is clamped in the desired position by means of nuts and bolts 77b passing through arcuate slots 76a in the arm 76. The sine bar is slotted at 77c and engages with pin 78a secured to a rack 78 embracing one edge of the bed 61 and having an edge 78b engaged in a channel 61b. Downward feed of the work-head 63 causes pin 78a to move up the slot 77 and thus the rack 78 is moved horizontally (from right to left in FIGURE 8). The teeth 78c of the rack are engaged with the teeth 79a of hollow pinion 79 journalled in the bed 61. Journalled in the hollow spindle 79b of pinion 79 is a pinion 80 having teeth 80a engaged with teeth 81a of a second rack 81. A hollow conical member 80c co-operates with a conical surface 79c on pinion 79 thus to act as a cone clutch and enable relative adjustment of the positions of pinions 79 and 80 to be made. A nut 80b permits engagement and disengagement of the clutch. A further pinion 82 having a splined central aperture 82a and having teeth 82b engaged with the rack 81 engages with splines on the vertical drill holder 83 which at its lower end is formed as a double acting cam follower having surfaces 83a and 83b co-operating with an eccentric 84 driven by an electric motor (not shown). The amplitude of movement of the drill may be about 25 thousandths of an inch and the frequency about 5000 per minute.

The drill 85 is carried in the top of the drill holder 83 in a manner to be insulated therefrom and is similar to that used in the machine of FIGURE 6. The blade 10 is supported in the structure consisting of the plates 70 and 71 in a manner not shown with its tip downwards. One electrical connection 86 is made to the root of the blade and the other connection 87 is made to the drill. A suitable potential difference is 10 volts and up to 100 amps. may be employed. As in the previous embodiments an electrolytic liquid such as one part of sodium silicate to four parts of water is supplied under pressure (say 200–250 lbs./sq. inch) to the hollow drill through pipe 88 from container 89.

The drill is supported just below the tip of the blade by passing through an aperture corresponding to its cross section in a bush of polytetrafluoroethylene 90 held by the ends of two arms 91 secured to and extending from the lower member 63. At a lower level the drill is supported by passing through a narrow aperture in supporting member 92 which is pivoted at 92a to its base 92b through which the drill holder passes. Pads of insulating material are provided in the aperture.

A drain tray 93 surrounds the drill and collects used electrolyte, a drain pipe 93a being provided from the tray.

The operation of the machine is similar to that for the previous embodiments except that to take care of the twist of the drill the sine bar 77 is set at the appropriate angle from the vertical so that as the blade descends the drill is turned through the rack 78, pinions 79, 80, rack 81 and pinion 82. To obtain correct orientation of the hole in the blade with respect to the camber line thereof before commencement of drilling the pinion 79 is disengaged from the pinion 80 by disengaging the cone clutch to permit the drill to be turned independently after which the clutch is again engaged.

If it is desired to drill a straight hole in the blade with this machine the drill is replaced by a straight one and the sine bar 77 is adjusted to be vertical so that no rotary motion is imparted to the drill. The supporting member 92 is swung out of the way and support arm 94 brought into position (as shown by the dotted lines in FIGURE 9) so that the mid portion of the drill is received between the jaws 94a which are lined with insulating material.

Correct orientation of the major axis of the hole with respect to the camber line of the blade is again obtained by releasing the cone clutch, rotating the drill and re-engaging the clutch.

When drilling straight holes it has sometimes been found desirable to vibrate the blade relative to the drill in the direction of the major axis thereof. Apparatus for effecting this is shown in FIGURES 7 and 8 and consists of an air motor 95 secured by member 96 to the work head 63, the motor being supplied with compressed air through pipe 97. The spindle of the motor carries an eccentric 98 which co-operates with the surfaces 99a and 99b of member 100 which is secured to plate 69. Plate 69 and thus the blade are reciprocated, the plate sliding in the channels 65b. An amplitude of 25 thousandths of an inch and a frequency of 120 per minute have been found to be suitable.

It will be observed by reference to FIGURES 3 and 4 that the hole pattern changes from the tip to root sections, the holes being splayed outwards towards the root. Such an arrangement is possible by adoption of the present invention, not readily being obtained in the previous adopted methods in which the passages are formed by forging and/or extrusion.

The invention is particularly suitable for rotor turbine blades but may also be used for stator blades commonly known as nozzle guide vanes.

Whilst the invention has been more particularly described as applied to blades having passageways of lenticular form, the process may also be used to form small diameter circular holes, the drill being of hollow circular form. Other shapes may be formed by appropriate selection of the cross-section of the drill.

If the passageways, 18, 19 and 20 are not, as shown, with their major axes inclined to the mean camber line of the blade but have their major axes substantially aligned with the mean camber line they may be made by being formed initially of circular cross-section and deformed to the shape illustrated during extrusion of the blade according to the method described in co-pending British application No. 31,228 of 1956.

We claim:

1. The method of forming a passageway in a metal part by electric arc disintegration comprising the steps of relatively reciprocating said part generally axially and a hollow electrically conducting tube sized and shaped in accordance with the passageway requirements, connecting the tube and the part in a direct current electric circuit, advancing said tube at such a rate as to cause the tube and part to approach without touching sufficiently close to effect arcing only between the tube tip and the bottom of the passageway at each reciprocation as the passageway is formed and flowing a stream of electrolyte through the hollow tube, said electrolyte having low conductivity and being capable of break-down at the voltage of said current at the nearest approach of the tube end and passageway bottom, said tube being helical, and a twisting action being produced between it and the part during the reciprocating and advancing operations.

2. The method of forming a passageway in a metal part by electric arc disintegration comprising the steps of relatively reciprocating said part axially in respect to a hollow electrically conducting tube sized and shaped substantially in accordance with passageway requirements, connecting the tube and the part in a direct current electric circuit, advancing said tube at such a rate as to cause the tube and part to approach without touching sufficiently close to effect arcing only between the tube tip and the bottom of the passageway at each reciprocation as the passageway is formed and flowing a stream of electrolyte through the hollow tube, said electrolyte having low conductivity and being capable of breakdown at the voltage of said current at the nearest approach of the tube end and passageway bottom, said passageway having an elongated transverse outline and said part being also reciprocated relative to said tube in the direction of the major axis of the cross-section of the passageway.

3. Apparatus for forming a passageway in a metal part by electric arc disintegration which comprises a hollow electrically conducting drill of helical shape, means for supporting the metal part and the drill, means to cause relative reciprocation between the drill and the part, means for causing relative axial movement between the drill and the part as the passageway is drilled, means for causing a flow of electrolyte fluid through the hollow drill, means for supplying a direct electric current between the drill and the part to cause arc disintegration between the drill and the part, the said relative forward movement means being arranged to position the drill tip sufficiently close to the passageway bottom and on each reciprocation to permit the arc to break down the electrolyte, said means for causing relative reciprocating movement between the drill and part being arranged to produce relative twist between the drill and the part during the drilling operation to advance the helical drill into the helical passageway.

4. Apparatus for forming a passageway in a metal part by electric arc disintegration which comprises a hollow, electrically conducting drill, means for supporting the metal part and the drill, means for causing relative reciprocation between the drill and part, means for causing relative axial movement between the part and the drill as the passageway is drilled, means for causing a flow of electrolytic fluid through the hollow drill, means for supplying a direct electric current in a circuit including the drill and part to cause arc disintegration between the drill and part, the said relative movement means being arranged to position the drill tip sufficiently close to the passageway bottom and on each reciprocation to permit the arc to break down the electrolyte, and means for reciprocating the part relative to the drill in the direction of the major axis of the cross-section of the passageway.

5. Apparatus for forming a passageway in a metal part by electric arc disintegration which comprises a hollow drill of a cross-sectional shape corresponding to the shape of the desired passageway, means for supporting the metal part and the drill vertically with the part above the drill and for causing progressive axial movement of the part, means for causing reciprocation of the drill with reference to the part, means for supplying an electric current in a circuit including the drill and part, means for containing and for delivering a supply of electrolyte under pressure to the hollow interior of the drill, a chamber surrounding the drill into which the electrolyte carrying the disintegrated portions of the part material falls and means for supporting those parts of the drill which are for the time being outside of the part so as to hold the same in the required relationship thereto.

(References on following page)

References Cited in the file of this patent

UNITED STATES PATENTS

| | | | |
|---|---|---|---|
| 2,383,383 | Harding | Aug. 21, | 1945 |
| 2,385,198 | Engle | Sept. 18, | 1945 |
| 2,441,319 | Harding | May 11, | 1948 |
| 2,490,302 | Holfelder | Dec. 6, | 1949 |
| 2,650,979 | Teubner | Sept. 1, | 1953 |
| 2,753,429 | McKechnie | July 3, | 1956 |
| 2,793,992 | Heuser | May 28, | 1957 |
| 2,796,509 | Blake | June 18, | 1957 |
| 2,818,490 | Dixon et al. | Dec. 31, | 1957 |
| 2,951,025 | Mostovych et al. | Aug. 30, | 1960 |
| 2,963,409 | Ramirez | Dec. 6, | 1960 |

OTHER REFERENCES

"Steel," Feb. 21, 1944, page 92.

"Metals and Alloys," November 1943, pages 1075–1080.

"Electrospark Process for the Machining of Metals," Lazarenko et al., Brutchert Translation No. 2547, pages 1–23, 1950.